(12) United States Patent
Helmschmidt

(10) Patent No.: US 9,065,629 B2
(45) Date of Patent: Jun. 23, 2015

(54) METHOD AND APPARATUS FOR REGULATING THE SAMPLING PHASE

(71) Applicant: Infineon Technologies AG, Neubiberg (DE)

(72) Inventor: Juergen Helmschmidt, Gilching (DE)

(73) Assignee: Infineon Technologies AG, Neubiberg (DE)

( * ) Notice: Subject to any disclaimer, the term of this patent is extended or adjusted under 35 U.S.C. 154(b) by 284 days.

(21) Appl. No.: 13/655,933

(22) Filed: Oct. 19, 2012

(65) Prior Publication Data

US 2013/0101075 A1    Apr. 25, 2013

(30) Foreign Application Priority Data

Oct. 20, 2011 (DE) .......................... 10 2011 116 585

(51) Int. Cl.
*H04L 7/00* (2006.01)
*H04L 7/04* (2006.01)

(52) U.S. Cl.
CPC ...................................... *H04L 7/042* (2013.01)

(58) Field of Classification Search
CPC ........................................................ H04L 7/042
USPC .................................. 375/316, 324, 354, 355
See application file for complete search history.

(56) References Cited

U.S. PATENT DOCUMENTS

| 6,229,862 | B1 | 5/2001 | Webb | |
| 7,751,518 | B2 * | 7/2010 | Lai et al. | 375/355 |
| 8,473,000 | B2 * | 6/2013 | Kelleher et al. | 455/552.1 |
| 2006/0256119 | A1 * | 11/2006 | Xiu et al. | 345/520 |
| 2008/0152057 | A1 * | 6/2008 | Lee et al. | 375/355 |
| 2009/0034671 | A1 * | 2/2009 | Konishi | 375/355 |
| 2009/0212824 | A1 * | 8/2009 | Pala | 327/9 |
| 2012/0008723 | A1 * | 1/2012 | Stojanovic | 375/355 |
| 2014/0205028 | A1 * | 7/2014 | Bogdan | 375/260 |

FOREIGN PATENT DOCUMENTS

| CN | 1500326 A | 5/2004 |
| CN | 101938347 A | 1/2011 |
| DE | 69230337 T2 | 6/2000 |
| EP | 1009125 A2 | 6/2000 |

* cited by examiner

*Primary Examiner* — Freshteh N Aghdam
(74) *Attorney, Agent, or Firm* — Eschweiler & Associates, LLC

(57) ABSTRACT

Embodiments of the invention relate to methods and circuits for controlling the sampling phase of a signal that is to be regenerated by sampling, particularly a serial communication signal, having method steps or means for oversampling the signal in order to ascertain samples of the signal during predetermined sampling phases, for determining differential errors between the samples during different instances of the predetermined sampling phases, for determining a differential error rate between the samples to at least one first and at least one second sampling phase on the basis of the ascertained differential errors, and for comparing at least two differential error rates based on at least two different sampling phase pairs in order to ascertain a decision concerning which of the predetermined sampling phases can be selected as a reference sampling phase for correctly regenerating the signal.

13 Claims, 5 Drawing Sheets

METHOD AND APPARATUS FOR REGULATING THE SAMPLING PHASE

REFERENCE TO RELATED APPLICATION

This application claims priority to German Patent Application No. 10 2011 116585.5, filed on Oct. 20, 2011.

FIELD

The present disclosure relates generally to the field of sampling phase regulation during the regeneration of signals and an apparatus and method associated therewith.

BACKGROUND

When data are received via serial communication channels, bit errors always arise to a greater or lesser extent in practice under real reception conditions. That is to say that the original values of the data cannot be recovered by the receiver without error.

The resulting bit error rate is typically at its lowest when the receiver samples the data at a recovered clock rate that corresponds to the transmitter clock rate, that is to say at the time at which the receiver clock is synchronized to the clock rate of the data that are being sent via the channel. As the transmission length without resynchronization between the transmitter clock rate and the receiver clock rate increases, the average bit error rate increases.

In the case of an existing DigRF interface, the attainment of a low bit error rate has to date been based on oversampling of the data signal on up to six sampling phases. Oversampling means that the data signal is sampled at a plurality of sampling times over a bit period duration T of the data signal. That is to say that, in the case of 6-fold oversampling, the data signal is sampled at six successive times within one bit period.

If the influences of phase noise are ignored, the sampling times within a bit period are at evenly distributed intervals of time from one another. In the case of six sampling phases used, this interval of time corresponds to a phase offset of $$\frac{T}{6}$$

or 60°, and in the case of four sampling phases used it corresponds to $$\frac{T}{4}$$

or 90°.

In a MIPI® DigRF interface (Mobile Industry Processor Interface), data are transmitted in layer 1 by means of data frames, the frames comprising a synchronization sequence which is always the same, a frame header—which determines the length of the frame, inter alia—and the resulting and subsequent user data (payload).

The invariable synchronization sequence at the start of a frame therefore makes it possible to check which sampling phases can be taken as a basis for detecting the data from the synchronization sequence which are consequently known at the receiver end. From these sampling phases, the one that is as central as possible within the bit period duration T is selected. Normally, this also corresponds to that sampling phase for which the sampling time involves the voltage difference between the two differential transmission signals—which represent the data—being at its greatest and hence the possibility of misinterpretation of the differential signal being at its lowest. In this case, DigRF systems especially use the concept of differential signaling (Low Voltage Differential Signaling). This involves a logic "1" being represented by a positive voltage difference between the voltages applied to the two transmission signals, and a logic "0" accordingly being represented by a negative voltage difference.

During the continued transmission of the frame, no further error correction takes place at the level of layer 1 that goes beyond the above selection of the reference sampling phase. Hence, a worsening data signal sometimes cannot be identified. In this case, the worsening of the data signal may involve a multiplicity of effects, such as increasing phase offset, relatively high phase noise, also called jitter, for the individual sampling times or a decreasing aperture angle in the eye diagram of the data signal.

Consequently, errors at the receiver end can be corrected only by means of redundant error correction codes, such as Reed-Solomon codes, at a relatively high protocol level or by re-requesting the defective frame—likewise at a relatively high protocol level.

Furthermore, the reference sampling phase as ascertained above is not always found to be the best possible sampling phase in practice, depending on the various cited impairments of the data signal.

SUMMARY

Apparatuses and methods for regulating the sampling phase during the regeneration of signals are provided, as are shown and/or described essentially in connection with at least one of the drawings and are presented comprehensively in the description below and in the patent claims.

Further features and advantages of the present invention can be found in the detailed description below which makes reference to the appended drawings, which—again merely for the purposes of illustrating the present invention—show exemplary embodiments.

BRIEF DESCRIPTION OF THE DRAWINGS

The drawings are appended in order to allow further understanding of the invention. They are part of the disclosure of the invention. The drawings explain exemplary embodiments of the present invention and, together with the description, serve to explain the principles of the invention. Further exemplary embodiments and many of the advantages of the present invention that said exemplary embodiments are intended to achieve become very evident when they become easier to comprehend with reference to the detailed description below.

In connection with regulation of the sampling phase during the recovery of a serial data signal.

In connection with regulation of the sampling phase during the recovery of a serial data signal.

In connection with regulation of the sampling phase during the recovery of a serial data signal.

DETAILED DESCRIPTION

Figure 1:
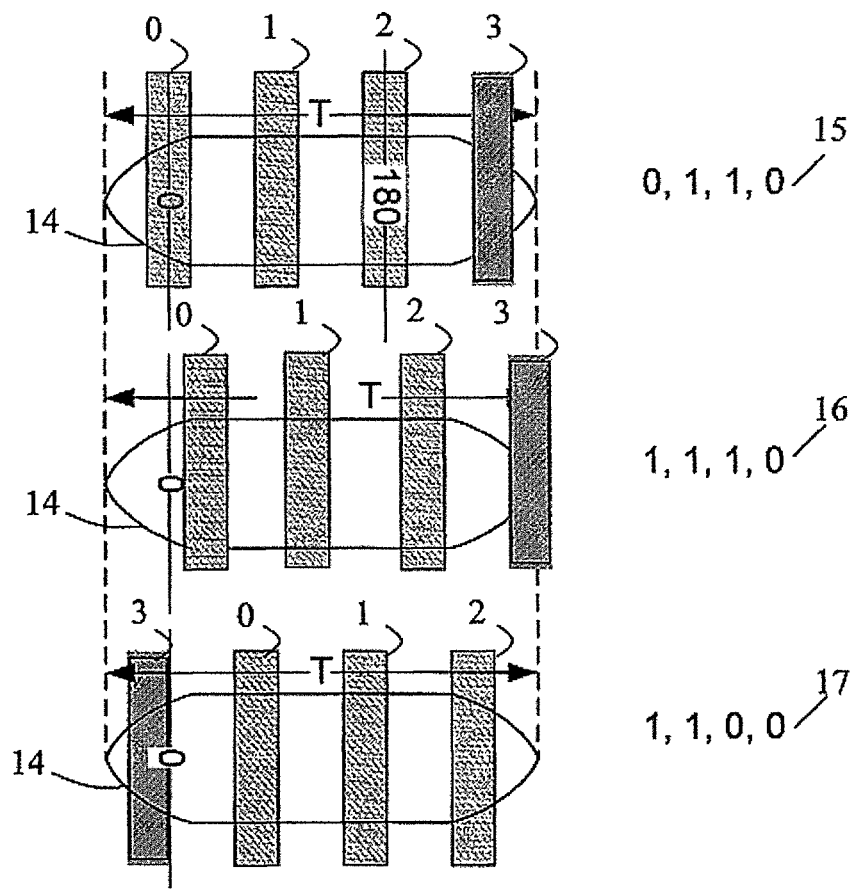
FIG. 1 shows the data signal as a schematic eye in a simplified eye diagram, which is sampled during four sampling phases per bit period, the four sampling phases having constant phase noise and a constant phase shift rate for the data signal, and the data signal having a constant aperture for the eye in the simplified eye diagram. In this case, the phase shift rate is assumed to be, inter alia, the frequency delta between the reference frequency at which the data are sent and the receiver frequency. In a transmitter/receiver situation that is assumed to be ideal, this would be zero.

The detailed description below makes reference to the appended drawings, which form part of the disclosure of the invention and which, for the purposes of illustration, show specific exemplary embodiments which allow the invention to be implemented by way of example in practice. It is self-evident that other exemplary embodiments can be used and structural or other alterations can be made without departing from the scope of protection of the present disclosure. The detailed description below is therefore not intended to be understood to be limiting. On the contrary, the scope of protection of the present disclosure is defined merely by the appended patent claims.

The text below describes the disclosure, for illustration purposes, inter alia with reference to a method and an apparatus for reducing the bit error rate in serial communication systems by means of an adaptive phase sequence system—particularly with reference to a DigRF interface.

However, the disclosure is not limited to such embodiments but rather can be used in conjunction with the sampling phase regulation during the regeneration of arbitrary signals by means of oversampling. However, a central area of application is sampling phase regulations for data and clock recovery for receivers of serial communication signals.

Embodiments of the invention allow a reduction in or avoidance of bits detected erroneously at the receiver end on the transmission channel by means of adaptive readjustment of said sampling phases. In addition, such readjustment of the sampling phases allows a reduction in the transmission errors caused by phase jitter or else phase noise.

Jitter, phase jitter or else phase noise is the temporally varying difference between an actual phase and an ideal phase, that is to say between an actual zero crossing and an ideal zero crossing in a harmonic oscillation or a periodic signal.

In addition, embodiments—for example in the form of an appropriate circuit—are capable of determining the absolute value of a frequency difference between the reference frequency at which the data are sent and the reference frequency at the receiver end. This allows a further regulatory parameter to be obtained for the voltage-controlled oscillator on which the receiver clock signal is based.

If the transmitter and the receiver of a communication system are situated in different areas of an automobile, for example, and different ambient conditions, particularly different temperatures, prevail in these areas then the latter can be reconstructed using an appropriately set up circuit based on an embodiment.

Such embodiments can therefore also be used as a sensor for providing early warning of system failures on the basis of extreme ambient conditions.

Controlled, temporally changing worsening and improvement of the eye signal can be taken as a basis for setting up a second data channel, in addition to the normal data transmission channel, which is orthogonal and which transmits additional user data information in parallel with the transmitted zeros and ones about the prescribed manipulated quality of the eye. In this case, it is conceivable for additional user data bits to be encoded in this data channel in order thus to raise the overall rate of the transmitted data, in common with encoding of check or error correction bits in this additional channel.

This is achieved by comparing the samples during a reference sampling phase with the adjacent sampling phases, which are likewise synchronized at the start of the frame, but also by comparing the samples with initially unsynchronized sampling phases. Furthermore, particular embodiments allow the constancy of the absolute value of the phase noise to be measured.

In this context, embodiments allow the use of relatively simple and hence relatively inexpensive oscillators, crystal oscillators and PLL circuits for circuits for recovering signals.

As already indicated above, a previous implementation to regulate the sampling phase attempts to detect the synchronization sequence at the start of a transmitted frame in the samples which have been ascertained in relation to every single one of the sampling phases. Of the sampling phases having the samples in which the synchronization sequence has been successively detected, the most central instance and hence the sampling phase which can be regarded as central in the bit period is selected. The circuit portions for ascertaining samples during the unselected sampling phases are switched off until the end of the frame.

In circuits within the context of embodiments, however, the samples can continue to be ascertained during all sampling phases up to the end of the frame, that is to say that the relevant circuit portions are not necessarily switched off. In particular embodiments, this may involve comparison of appropriate samples taking place during different sampling phases as soon as the synchronization sequence has been detected in the samples from adjacent sampling phases.

In the case of more than three sampling phases having samples in which the synchronization sequence has been successfully detected, matching data values can usually be detected at the start of the frame in the samples during all sampling phases. In particular embodiments, this involves the performance of a continuous comparison of the digital samples during all the sampling phases, while other embodiments involve the performance of the comparison at least during the sampling phases having samples in which the synchronization sequence has been successfully detected at the outset, however.

If incipient discrepancies are found between the ascertained signal values in the samples during the sampling phases having samples in which the synchronization sequence has been successfully detected at the outset, this indicates an alteration in the phase of the signal in relation to the clock signal for the sampling, in the jitter of the sampling phases or in the signal quality with respect to the eye diagram of the received signal.

In data transmission, an eye diagram denotes a diagram which results from successive sections of the time profile of a data signal being shown above one another with signal changes after different numbers of bit periods in a presentation area (for example on an oscilloscope), the width of which corresponds to one or more bit periods.

The term eye diagram becomes most easily evident in light of the superimposed presentation of the time profile of a "1-0-1" and a "0-1-0" data sequences in the same presentation area, the width of which likewise corresponds to three bit periods.

In the time profiles of the "1-0-1" and "0-1-0" data sequences, which time profiles are shown above one another, the data sequences meet at two points between the signal levels "0" and "1". As a result of the transition times, which are finite in reality, a shape similar to an eye is thus obtained between the points and outlined by the superimposed rising/falling edges of the data sequence profiles.

In embodiments, targeted modulation of this eye shape can be used to encode further information into the data signal and thereby to introduce a superimposed, parallel data channel in order to raise the data throughput rate. This information that has been modulated into the eye shape can then be recovered by the—for example 6-fold—oversampling at the receiver end.

In addition, it is also possible to ascertain the relative profile of the samples in relation to the eye diagram of a differential signal in embodiments by virtue of a series of comparisons between the differential errors in the samples during predetermined sampling phases.

The text below describes three typical possibilities for worsening signal quality in connection with the figures, the possibilities being able to be detected and also distinguished to a certain degree using embodiments.

In this context, FIG. 1 shows the effect of a constant phase shift rate for the transmitted signal in terms of the sampling phases or sampling times linked to the oversampling in a receiver. This phase shift rate is obtained by virtue of a frequency offset between the clock rate of the relevant transmitter and the clock rate of the receiver clock used for the sampling.

Figure 3:
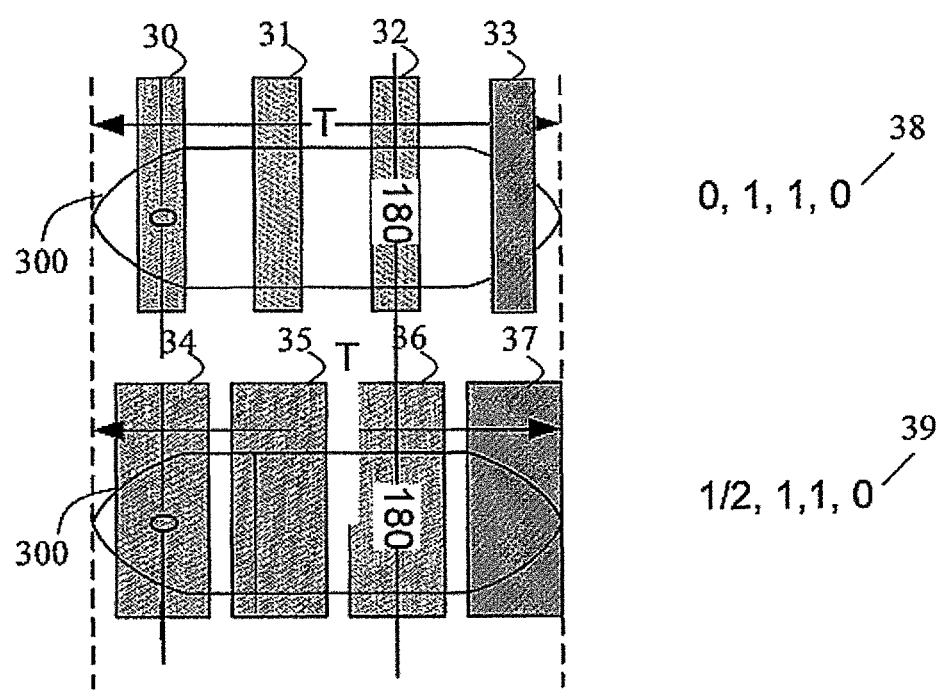
FIG. 3 shows the data signal as a schematic eye in a simplified eye diagram, which is sampled during four sampling phases per bit period, the four sampling phases having increasing phase noise and no phase shift rate for the data signal, and the data signal having a constant aperture for the eye in the simplified eye diagram.
Figure 4:
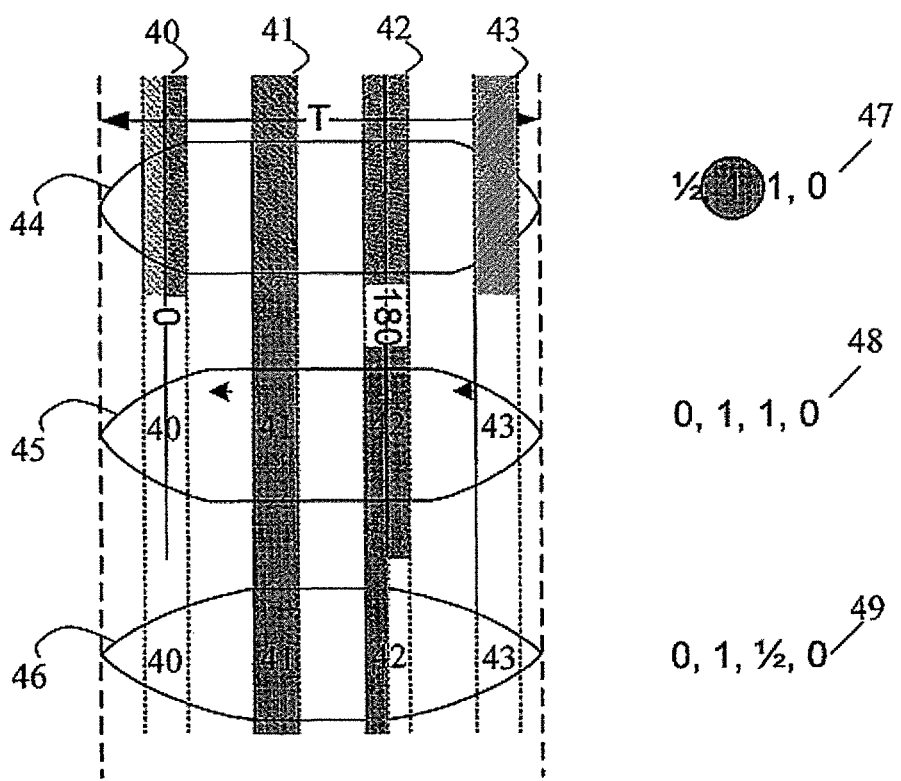
FIG. 4 shows the data signal as a schematic eye in a simplified eye diagram, which is sampled during four sampling phases per bit period, the four sampling phases having constant phase noise and no phase shift rate for the data signal, and the data signal having a diminishing aperture for the eye in the simplified eye diagram.

By contrast, FIG. 3 shows the effect of an increasing uncertainty range for the position of the actual sampling phases as a result of increasing phase noise in the reception clock in relation to ideal sampling phases. Finally, FIG. 4 shows the effects of a worsening aperture angle in relation to the eye diagram of a received signal.

Again with reference to FIG. 1, a case with 4-fold oversampling of a data signal is shown, from which four sampling phases 0, 1, 2, and 3 or—in other words—four sampling times per bit period are obtained.

In this case, it is then assumed that the individual sampling times have a phase noise of 10% based on the bit period duration T. This value of the phase noise in the sampling phases 0, 1, 2 and 3 is shown in FIG. 1 by means of uncertainty ranges, which are symbolized therein as hatched vertical strips of appropriate width.

In this case, the phase noise is assumed to be constant over time, which means the width of the strips symbolizing the sampling phases 0, 1, 2 and 3 in all three illustration sections—relating to different times—in FIG. 1 remains the same.

In these illustration sections above one another, the reference symbol 14 denotes a schematic eye in a simplified eye diagram in order to be able to reproduce the relative position of the sampling phases 0, 1, 2 and 3 in relation to the relevant transmission eye.

In summary, the first case of impairments during the regeneration of a received signal, shown in FIG. 1, is distinguished by constant phase noise and a constant phase shift rate for the data signal in respect of the sampling phases. In addition, in this first case, a constant aperture angle or else a constant aperture for the schematic eye 14 in the simplified eye diagrams in the illustration sections in FIG. 1 is assumed. In this case, the aperture angle is a measure of the quality of the eye and correlates to the bandwidth of the transmission channel, inter alia.

A constant phase shift rate for the data signal in respect of the sampling phases means that the clock rates used for generating the transmitted data in the transmitter and those for recovering the data in the receiver do not match completely.

The sampling times corresponding to the sampling phases 0, 1, 2 and 3 therefore move graphically at a constant phase shift rate through the schematic eye 14. This becomes clear in the succession of illustration sections relating to different times in FIG. 1. Thus, by way of example, the sampling phase 0 migrates from the position at the left-hand edge of the schematic eye 14 in the upper illustration section increasingly toward the center of the corresponding schematic eyes 14 in the two lower illustration sections.

This behavior of the positions of the sampling phases 0, 1, 2 and 3 in respect of the schematic eyes 14 in FIG. 1 therefore shows the standard case of impairments during the regeneration of the received data signal, namely the aforementioned frequency offset between the transmission and reception clock rates.

Depending on which of the four sampling phases 0, 1, 2 and 3 enter—in graphical terms—the window of the sampling phases that correctly detect the synchronization sequence and which of them leave, it becomes possible to identify whether the receiver is operated at a slightly lower or a slightly higher clock rate than the transmitter. From the speed at which the sampling phases that correctly detect the synchronization sequence change it is also possible to ascertain the level of the differential frequency.

In the case shown in FIG. 1, there are initially—that is to say in the upper illustration section of FIG. 1—the two sampling phases 1 and 2 of identical sampling, that is to say that the samples from the sampling phases 1 and 2 are always the same value at the beginning of the frame. Specifically, it is assumed in relation to the upper illustration section from FIG. 1 that the sampling phases 0, 1, 2 and 3—in respect of their position in relation to the schematic eye 14—detect the respective samples 0, 1, 1 and 0, that is to say a first sample sequence 15.

The constant phase shift rate means that all four sampling phases 0, 1, 2 and 3 have been shifted to the right in comparison with the schematic eye 14 in the middle illustration section from FIG. 1. As a result, the sampling phases 0, 1, 2 and 3—in respect of their altered position in comparison with the schematic eye 14—ascertain the respective samples 1, 1, 1 and 0, which correspond to a second sample sequence 16.

In the lower illustration section from FIG. 1, all four sampling phases 0, 1, 2 and 3 have been shifted even further to the right in comparison with the schematic eye 14. Since the sampling phase 3 would thereby shift beyond the right-hand edge of the schematic eye 14 and hence beyond the next bit change, the sampling phase which is closest to the left-hand edge of the schematic eye 14 is now defined as sampling phase 3. Accordingly, the sampling phases 0, 1, 2 and 3—in respect of their altered position in comparison with the schematic eye 14—ascertain the respective samples 1, 1, 0 and 0, which correspond to a third sample sequence 17.

The increasing shift in the sampling phase 3 to the right-hand edge of the schematic eye 14 between the times symbolized by the upper and middle illustration sections in FIG. 1 means that the sampling phase 3 first of all delivers increasingly deviating samples in relation to the samples from the sampling phases 1 and 2, namely increasingly the sample 0.

By contrast, the discrepancies in the samples from sampling phase 0, which increasingly ascertains the sample 1 in the same manner as sampling phases 1 and 2, decrease. In other words, since the discrepancies relate to a predetermined period, the discrepancy rate from the samples from the sampling phase 0 in relation to the samples from the sampling phases 1 and 2 decreases.

From this, it is possible to infer that the relatively earliest sampling phase 0 samples the data signal increasingly later in respect of the last bit change, whereas the initially relatively latest sampling phase 3 samples the data signal at an increasingly shorter interval of time in respect of the next bit change. That is to say that the edges—which are prescribed by the reception clock rate—of the sampling clock cycles linked to the sampling phases become increasingly later in comparison with the edges of the last bit change, which are prescribed by the transmission clock rate. From this, it is possible to infer a higher transmission clock rate in comparison with the receiver clock rate in the case shown in FIG. 1.

In embodiments, the respective samples from two adjacent sampling phases are compared in addition to the comparison of the actually ascertained bit values from the initially synchronous sampling phases, that is to say the sampling phases that identify the synchronization sequence, in order to determine the differential error rates. If the samples do not match, an appropriate differential error register—which shows the absolute number of discrepancies between relevant samples from these sampling phases, is raised by one. From this, it is possible to ascertain the absolute number of discrepancies between relevant samples from these two sampling phases.

Figure 2:
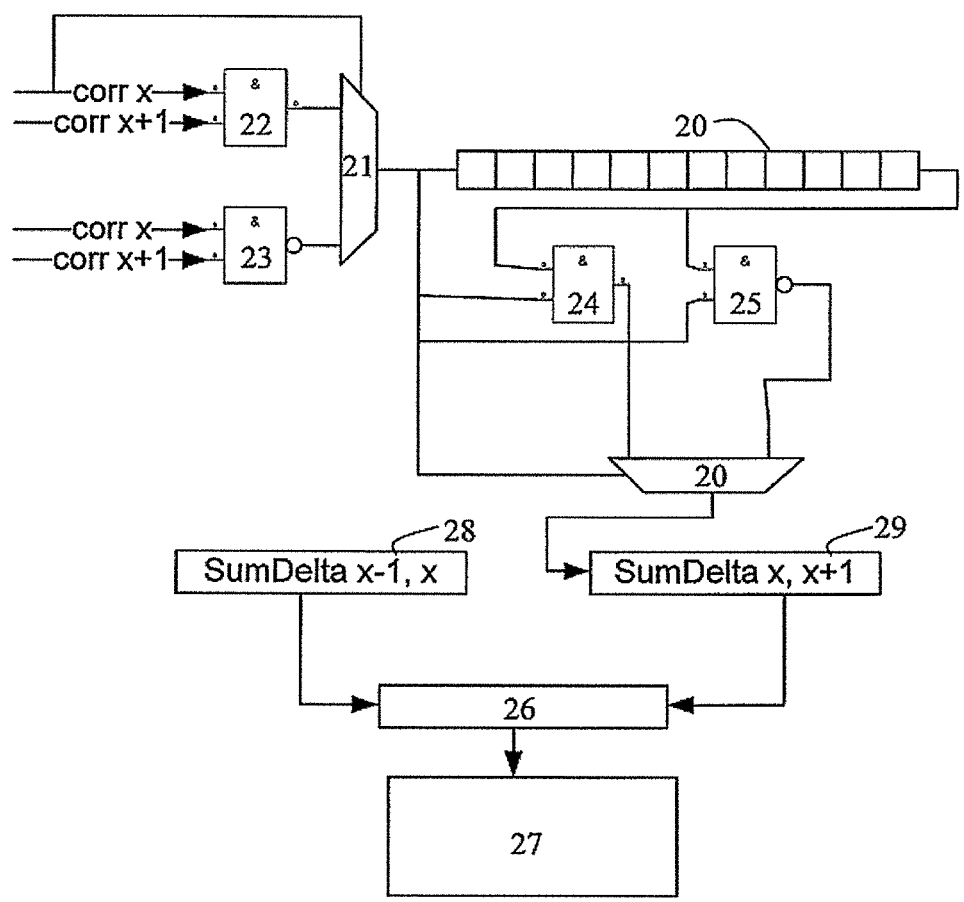
FIG. 2 shows an example embodiment of a circuit for regulating the sampling phase during the recovery of a serial data signal using a shift register for tracing a history of differential errors between samples based on a predetermined pair of adjacent sampling phases and an actuating circuit for a count register for summing the relevant differential errors.

In the embodiment shown in FIG. 2, the samples from adjacent sampling phases are compared by means of an AND gate 22 and a NAND gate 23. The multiplexer 21 is used to select that comparison result which corresponds to the respective logic value "0" or "1" of the compared sample from the output values from the logic gates 22 and 23.

To trace the history of the differential errors, the comparison result obtained in this manner can be shifted by means of the multiplexer 21 into a shift register as a differential error register 20 per sampling clock cycle. In the event of a discrepancy, that is to say differently ascertained relevant samples from adjacent sampling phases, a logic "1" is shifted into the differential error register 20, this being a "0" in the event of a match. This differential error register 20 may have a depth of 32 bits, for example. In this case, the depth of the differential error register 20 can be chosen in arbitrarily suitable fashion in order to determine the number of sampling periods over which a moving average for the differential errors in the compared samples is intended to be formed. Dynamic alteration of the register depth during runtime is also conceivable. A large register depth results in greater hysteresis in this context, and it therefore takes longer before a particular trigger value is reached, whereas a differential error register of relatively small depth sometimes involves faster switching to and fro between sampling phases. Embodiments may comprise one or more of the shift registers.

A count register 29 ascertains the number of nonmatches in this differential error register 20. In this regard, each logic '1' that is shifted into the differential error register 20 involves the count register 29 being raised by one, and each logic '1' taken from the end involves the count register 29 being lowered by one. This is accomplished by means of the AND gate 24 and the NAND gate 25 connected to the input and the output of the differential error register 20 shown in FIG. 2 and also by means of the multiplexer 20 for the purpose of selecting the output values from the logic gates 24 and 25 and actuating the count register 29.

This count register 29 thus counts from 0 to 32 in the example instance and is either raised by one when a logic '1' is shifted into and at the same time a logic '0' is shifted out from the differential error register 20, remains the same when a logic '0' is shifted in and at the same time a logic '0' is shifted out and when a logic '1' is shifted in and at the same time a logic '1' is shifted out, or is reduced by one when a logic '0' is shifted in and a '1' is shifted out. It is therefore impossible for the count register 29 to overflow in one embodiment. In this sense, the count register forms a moving window for the rear n count clock cycles and the errors which have occurred in this period.

The differential error register 20 can therefore be used to ascertain the temporally moving average of the differential errors between the relevant samples from two sampling phases.

With reference to the case in FIG. 1, this differential error is initially zero between the samples from the sampling phases 1 and 2, not equal to zero between the samples from the sampling phases 2 and 3 and not equal to zero between the samples from the sampling phases 0 and 1. As time progresses, the average differential error decreases between the samples from the sampling phases 0 and 1 and increases between the samples from the sampling phases 2 and 3.

In the embodiment shown in FIG. 2, the moving averages of the numbers of differential errors between the samples from the sampling phases 0 and 1, SumDelta(0,1), and between the samples from the sampling phases 2 and 3, SumDelta(2,3), can again for their part be compared with one another and differences can be formed. In the case shown in FIG. 1, SumDelta(2,3) will increase over the course of time, while SumDelta(0,1) decreases.

The difference SumDelta(2,3)–SumDelta(0,1) is thus initially positive in relation to the samples shown in FIG. 1, then has a zero crossing and finally becomes negative.

The zero crossing can be used to define a trigger time in order to remove the sampling phase 3 from the group of sampling phases which measure a particular eye and replace it with the sampling phase 0, as also illustrated by the lower illustration section from FIG. 1.

In the example embodiment shown in FIG. 2, only differential errors between the samples from the adjacent sampling phases 0 and 1 are counted by the further count register 28 and only differential errors between the samples from the adjacent sampling phases 2 and 3 are counted by the aforementioned count register 29. In other example embodiments, differential errors between the samples from any sampling phase pairs can be formed and counted.

From the average number of differential errors between the samples from a predetermined sampling phase pair, it is therefore also possible to derive a differential error rate for the samples from the predetermined sampling phase pair by referring to the relevant interval of time within which the number of differential errors has been ascertained.

In the example embodiment shown in FIG. 2, the differential errors in the samples from the sampling phase pair 0 and 1 and from the sampling phase pair 2 and 3 are compared with one another by the comparator 26. In further embodiments, it is firstly possible to compare the differential errors from any sampling phase pairs with one another, and secondly it is also or alternatively possible to perform a comparison with differential error thresholds, that is to say constant normal values, in order to derive decisions regarding the reference sampling phase to be selected in what is known as a decision matrix therefrom. This decision matrix is denoted in FIG. 2 by the reference symbol 27.

One of the possible decisions for the decision matrix is the switch from the original reference sampling phase to a new reference sampling phase, for example, this decision typically being valid for a relatively long time, and in one embodiment having a predeterminable validity period.

In the case of three or more sampling phases having samples in which the synchronization sequence can be detected but delivering different samples from one another, a majority decision between these sampling phases can involve deciding which sample can be regarded as correct and is therefore processed further in the relevant system for data recovery. This decision can be supported by the differential error rates of the samples from these sampling phases, which therefore permit a statement about the quality and probability of freedom from error of the received signal.

In connection with regulation of the sampling phase during the recovery of a serial data signal, FIG. 3 shows the data signal as a schematic eye 300 in a simplified eye diagram, which is likewise sampled during four sampling phases 30, 31, 32 and 33 per bit period. In this case, the four sampling phases have increasing phase noise and no phase shift rate for the data signal, and the data signal has a constant aperture for the eye in the simplified eye diagram.

In this respect, FIG. 3 shows the effect of an increasing uncertainty range for the position of the actual sampling phases by means of increasing phase noise in the reception clock in relation to ideal sampling phases.

This increasing jitter can in turn be identified, by considering the differential error rates, from the fact that the middle sampling phases ascertain constant samples, but the sampling phases situated at the edge with initially matching samples begin to have an increasing number of differential errors in comparison with the samples from the middle sampling phases.

In the upper illustration section in FIG. 3, the individual sampling times corresponding to the sampling phases 30, 31, 32 and 33 initially have a phase noise of 10% based on the bit period duration T. Again, the value of the phase noise from the sampling phases 30, 31, 32 and 33 is also shown in FIG. 3 by means of uncertainty ranges, which are symbolized therein as hatched vertical strips of appropriate width.

Accordingly, the sampling phases 30, 31, 32 and 33—in respect of their stable position in comparison with the schematic eye 300 in the upper illustration section—ascertain the respective samples 0, 1, 1 and 0, which correspond to a further sample sequence 38.

In the lower illustration section in FIG. 3, the individual sampling times that correspond to the sampling phases 34, 35, 36 and 37 have, by contrast, a phase noise of 20% based on the bit period duration T. The hatched vertical strips are correspondingly wider in the lower illustration section in FIG. 3, the strips symbolizing the increased value of the phase noise in the sampling phases 34, 35, 36 and 37 by means of correspondingly larger uncertainty ranges.

Accordingly, the data signal in the lower illustration section in FIG. 3 is sampled, during the sampling phases 34 and 37, despite the position thereof at the edges of the schematic eye 300, increasingly at sampling times which may also be situated closer to the center of the schematic eye 300 on account of the increased phase noise. As a result, the sampling phases 34, 35, 36 and 37 ascertain the respective samples ½, 1, 1 and 0, which correspond to a further sample sequence 39.

That is to say particularly that the sampling phase 34 at the left-hand edge of the schematic eye 300 samples, increasingly to the same extent, the value 0 when the actual sampling time is close to the time of the last bit change on account of the increased phase noise, and the value 1 when the actual sampling time has moved closer to the time of the bit center on account of the increased phase noise. In this respect, averaged over a particular period, the mean sample ½ is detected.

As for FIG. 1 already, the moving averages of the numbers of differential errors between the samples from the sampling phases 30/34 and 31/35, SumDelta(0,1), between the samples from the sampling phases 31/35 and 32/36, SumDelta(1,2) and between the samples from the sampling phases 32/36 and 33/37, SumDelta(2,3) can also be formed in relation to the characteristics of the sampling phases and data signal in FIG. 3. In the case shown in FIG. 3, SumDelta (1,2) remains constant, whereas SumDelta(2,3) and SumDelta(0,1) increase concurrently.

In connection with regulation of the sampling phase during the recovery of a serial data signal, FIG. 4 shows the data signal as a schematic eye 44 in a simplified eye diagram, which is sampled during four sampling phases per bit period. In this case, the four sampling phases 40, 41, 42 and 43 have constant phase noise and no phase shift rate for the data signal, and the data signal has a diminishing aperture for the eye in the simplified eye diagram. This is clarified in FIG. 4 by decreasing aperture angles for the schematic eyes 44, 45 and 46 in the sequence of illustration sections in FIG. 4.

In this respect, FIG. 4 shows the effects of a diminishing aperture angle for the eye in the eye diagram for a received signal on the regeneration of the signal as a result of oversampling during four sampling phases.

In relation to the upper illustration section in FIG. 4, the schematic eye 44 for the sampling phases 40, 41, 42 and 43 ascertains the respective samples ½, 1, 1 and 0, which correspond to a sample sequence 47.

As a result of the reduced aperture angle of the schematic eye 45 in the eye diagram for a received signal in the middle illustration section in FIG. 4, the sampling phases 40 and 43 at the edges of the schematic eye 45 ascertain the value 0 with relatively great probability. As a result, the sampling phases 40, 41, 42 and 43 in the middle illustration section in FIG. 4 ascertain the respective samples 0, 1, 1 and 0, which correspond to a sample sequence 48.

With reference to the even further reduced aperture angle of the schematic eye 46 in the eye diagram for a received signal in the lower illustration section in FIG. 4, not only the sampling phases 40 and 43 at the edges of the relevant schematic eye 46 ascertain the value 0 with relatively great probability. On the contrary, a certain asymmetry (not shown) in the schematic eye 46 which is open even less is taken as a basis for assuming that the sampling phase 42 also delivers the sample 0 evermore frequently, which results in an averaged sample ½. Accordingly, the sampling phases 40, 41, 42 and 43 in the lower illustration section in FIG. 4 ascertain the respective samples 0, 1, ½ and 0, which correspond to a sample sequence 49.

For this, it can be seen that, with constant phase noise and a constant phase relationship between the sampling phases and the bit period, but a diminishing aperture of the eye in the eye diagram for the data signal, the number of sampling phases with matching samples decreases. Accordingly, it is possible to establish in the series of sample sequences 47, 48 and 49 a fall in the sampling phases with matching samples that are central with respect to the bit period.

This indicates a reduced bandwidth for the transmission channel between the transmitter and the receiver, which can be caused by increasingly poorer transmission of the signal by the connection pads in the transmitter, for example.

In relation to FIG. 4, if it is assumed that the sampling phase 41 highlighted in the upper illustration section has initially been selected as the reference sampling phase, the series of sample sequences 47, 48 and 49 in the illustration sections in FIG. 4 makes it clear that it makes sense in this case to obtain the sampling phase 41 over the frame as the reference sampling phase.

In relation to the characteristics of sampling phases and data signal in FIG. 4 too, the moving averages of the numbers of differential errors between the samples from the sampling phases 40 and 41, SumDelta(0,1), between the samples from the sampling phases 41 and 42, SumDelta(1,2) and between the samples from the sampling phases 42 and 43, SumDelta(2,3), can be formed.

In the case shown in FIG. 4, SumDelta(1,2) still remains almost constant for the longest, because the central sampling phases 41 and 42 still ascertain the sample 1 for the longest. By contrast, SumDelta(0,1) and SumDelta(2,3) will initially increase because the sampling phases 40 and 43 at the edges of the bit period detect the sample 0 with greater probability on account of the eye closing to the greatest extent at that point, while the central sampling phases 41 and 42 still ascertain the sample 1.

However, the sample ½ during the sampling phase 42 in the last sample sequence 49 for the smallest eye aperture makes it clear that SumDelta(0,1) and SumDelta(2,3) will decrease again as the eye closes further. This results from the fact that the central sampling phases 41 and 42 will also ascertain a reduced sample and, in the extreme case, also just the sample 0 with ever greater probability on account of the eye closing further.

During the comparison of the moving averages of the numbers of differential errors SumDelta(0,1), SumDelta(1,2) and SumDelta(2,3) between the samples from the relevant sampling phase pairs in relation to FIGS. 1, 3 and 4, it becomes clear that the characteristic temporal alteration patterns thereof permit up to a certain level of distinction of the impairment effects during the regeneration of a received signal such as a constant phase shift rate and increasing phase noise for the sampling phases in comparison with the signal and also a diminishing eye aperture in the eye diagram for the signal.

Thus, in the case of a pure, temporally constant phase shift rate for the sampling phases in respect of the data signal, for example, the samples from the sampling phases that are each at the edges of the bit period in question have the largest differential errors. The samples from the sampling phases that are each situated in the center of the maximum eye aperture have no discrepancies and hence no differential errors.

As a result of the constant phase shift rate, the relevant sampling phase pairs without differential errors migrate over time. From this, it is possible to ascertain the difference between the clock rates of the transmitter and the receiver and possibly to readjust the voltage-controlled oscillator which produces the receiver clock to suit the transmission clock. In this case, the sampling phases without differential errors can be used as reference sampling phases for the signal transmission of the actual user signal.

In the case of a pure change in the phase noise, the sampling phases which are central with respect to the bit period and have samples having no differential errors do not migrate over time. By contrast, the differential errors in the samples increase in the case of the sampling phase pairs situated at the edges of the bit period. Sampling phases situated directly in the region of the bit changes ascertain largely constant samples on account of the decision-maker hysteresis in practical systems. Hence, it is also possible to use the constancy of the samples in this case for the analysis of which impairment effect is present.

Finally, the case of a change in the quality of the eye can be identified from the fact that the sampling phase area with low differential error rates in adjacent sampling phases around sampling phases that are central with respect to the bit period either extends uniformly over the sampling phases situated toward the edges of the bit period in the case of an improvement in the quality of the eye or, if the quality of the eye is worsened, constricts itself uniformly toward the sampling phases situated centrally with respect to the bit period. Hence, repeated comparisons of particular differential error rates also allow the eye quality to be ascertained.

Naturally, linear superimpositions of the impairment effects are possible in practice, and these can also be resolved to a certain degree as mentioned.

In particular embodiments, the received data signal is in the form of a differential voltage signal. In such cases, what is known as the decision-maker hysteresis should also be involved in ascertaining the samples. This is the hysteresis which is obtained in the transfer function of practical decision-maker circuits when a prescribed sample is associated with a particular input differential voltage. The text below considers embodiments in which the input differential voltage is associated with a digital 1-bit sample.

In particular example embodiments, the bit values of the digital sample are explicitly defined only for an absolute value of between 250 mV and 400 mV for the input differential voltage. By contrast, the bit value of the digital sample is undefined in the region of the absolute value of the input differential voltage between 0 mV and 100 mV.

In the embodiments, hysteresis may still ensue in the event of a bit change in the digital sample, however. For a change in the digital sample from 1 to 0, it may be necessary, in this respect, for the input differential voltage to additionally fall beyond the zero crossing thereof at least to the negative AC threshold voltage of −25 mV, until a new digital sample can be assumed. That is to say that from −25 mV downward the associated digital sample can change its value, whereas input differential voltages of less than or equal to −100 mV are explicitly associated with the digital sample 0.

In a further embodiment, the oversampling can have a further use, which has already been addressed, beyond the analysis of the impairment effects in the transmission eye. Thus, by way of example, the ascertainment of six samples can, as an alternative when a signal can be assumed to be stable, artificially enlarge or reduce the eye on a point-by-point basis for every 1-0 sequence that the signal contains. In other words, on the basis of the above description, the signal quality that can be detected by the oversampling can be artificially modulated in the form of the size of the eye aperture, for example.

In line with the modulation, the samples from a greater or lesser number of sampling phases will match the sample from the reference sampling phase. This allows a data channel that is parallel to the actual data channel, in order to transmit additional data. By way of example, these data may be error correction bits, which are likewise used to reduce the number of transmission errors just on layer 1 to a minimum and to therefore make the corresponding data transmission system more powerful overall.

In one example embodiment, a differential signal at the frequency 300 MHz, for example, is oversampled sixfold, that is to say is sampled at a frequency of 1800 MHz, with the analog signal likewise being converted into a digital sample at the depth of one bit, that is to say having samples 0 or 1.

One example embodiment relates to a method for controlling the sampling phase of a signal to be regenerated by sampling which has the following steps. One step involves n-fold oversampling of the signal with n≥3, in order to obtain n samples A(i) for n sampling phases AP(i) per period duration T of the signal with i=0, 1, ... n−1.

A further step involves the formation of respective differential errors Delta(i, i+m)=A(i+m)−A(i) between at least two respective samples A(i+m) and A(i) for at least two different i from i=0, 1, ... n−2 and at least one m with m≥1 with m+i≤n.

A further step involves the continuous summation of the respective differential errors Delta(i, i+m) for the at least two different i from i=0, 1, ... n−2 and the at least one m with m≥1 with m+i≤n.

In addition, one step involves the formation of respective temporally moving differential error averages SumDelta(i, i+m) of the summed differential errors Delta(i, i+m) for the at least two different i from i=0, 1, ... n−2 and the at least one m with m≥1 with m+i≤n over a predetermined number of sampling periods T'.

Another step in the method involves the comparison of at least two temporally moving differential error averages SumDelta(i, i+m) of the summed differential errors Delta(i, i+m) for the at least two different i from i=0, 1, ... n−2 and the at least one m with m≥1 with m+i≤n, in order to obtain at least one comparison result.

Finally, the at least one comparison result is used to decide during which of the n sampling phases AP(i) the samples have the least discrepancy from the actual signal values on average, that is to say which of the n sampling phases AP(i) can be selected as a reference sampling phase.

A second embodiment of the method involves the additional formation of differential errors Delta(i, i+m) between further predetermined—for example, all—sample pairs for further i from i=0, 1, ... n−2 and/or further m with m≥1 with m+i≤n.

A third embodiment involves the use of the temporally moving differential error averages SumDelta(i, i+m) of the summed differential errors Delta(i, i+m) to derive at least two differential error rates DiffErrRate(i, i+m) between the samples during the i-th or (i+m)-th sampling phase—that is to say based on the sampling phase pair AP(i), AP(i+m)—for the at least two different i from i=0, 1, ... n−2 and the at least one m with m≥1 with m+i≤n.

According to a fourth embodiment, at least two of the derived differential error rates DiffErrRate (i, i+m) and DiffErrRate(i+o, i+m+o) based on at least two predetermined—for example, all—sampling phase pairs are compared for 1≤m; 1≤o; m+i+o≤n, wherein a resulting further comparison result is likewise used for the decision about which of the n sampling phases AP(i) can be selected as a reference sampling phase.

A fifth embodiment involves the comparison of at least one differential error rate DiffErrRate(i, i+m) with at least one appropriate predetermined differential error threshold, wherein a resulting further comparison result is likewise used for the decision about which of the n sampling phases AP(i) can be selected as a reference sampling phase.

A sixth embodiment of the method involves the weighting relative to one another of at least two comparison results between the temporally moving differential error averages SumDelta(i, i+m), the differential error rates DiffErrRate(i, i+m) and/or the differential error rates DiffErrRate(i, i+m) with the predetermined differential error thresholds by means of a decision matrix, in order to derive therefrom the decision concerning which of the n sampling phases AP(i) can be selected as a reference sampling phase.

According to a seventh embodiment, the signal is a digital communication signal which comprises a synchronization sequence, wherein the comparison of the differential error averages SumDelta(i, i+m) with one another, of the differential error rates DiffErrRate(i, i+m) with one another and/or of the differential error rates DiffErrRate(i, i+m) with the predetermined differential error thresholds takes place only when the synchronization sequence can be detected in the samples during at least two adjacent sampling phases.

An eighth embodiment involves the decision concerning which of the n sampling phases AP(i) to select as a reference sampling phase being made, in the event of the synchronization sequence being able to be detected in the samples during three or more sampling phases, as a majority decision between the three or more sampling phases on the basis of the differential error rates between these three or more sampling phases.

According to a ninth embodiment, the differential errors Delta(i, i+m) are summed by using a shift register as a differential error register. This involves a logic "1", for example, being shifted into the differential error register per sampling period T' in the event of the absolute value of the compared samples being above or the same as a predetermined differential threshold $A_{Th}$, $|A(i+m)-A(i)| \geq A_{Th}$, that is to say practically a nonmatch between the compared samples. By contrast, a logic "0", for example, is shifted into the differential error register in the event of the absolute value of the compared samples being below the predetermined differential threshold $A_{Th}$, $|A(i+m)-A(i)| < A_{Th}$, that is to say practically a match between the compared samples.

A tenth embodiment relates to a method according to the ninth embodiment, wherein the summation also comprises a count register which records the number of nonmatches for appropriate samples in the differential error register by virtue of each logic "1", for example, shifted into the differential error register and at the same time each logic "0", for example, shifted out of the differential error register involving the count register being raised, each logic "0" shifted into the differential error register and at the same time each logic "0" shifted out of the differential error register, or each logic "1" shifted into the differential error register and at the same time each logic "1" shifted out of the differential error register, involving the count register remaining unchanged, and by virtue of each logic "0" shifted into the differential error register and at the same time each logic "1" shifted out of the differential error register involving the count register being lowered.

An eleventh embodiment relates to a method according to the ninth or tenth embodiment, wherein the differential error register has a depth of 32 bits.

A further embodiment relates to a circuit for controlling the sampling phase of a signal that is to be regenerated by sampling having a means for oversampling the signal in order to ascertain samples of the signal during predetermined sampling phases. In addition, the circuit has a means for determining differential errors between the samples during different instances of the predetermined sampling phases.

Besides this, the circuit also comprises means which, based on the ascertained differential errors, are set up to determine a differential error rate between the samples during at least one first and at least one second sampling phase, that is to say to determine a differential error rate based on a predetermined sampling phase pair.

Finally, the circuit has means for comparing at least two differential error rates based on at least two different sampling phase pairs in order to ascertain a decision concerning which of the predetermined sampling phases can be selected as a reference sampling phase for correctly regenerating the signal.

Figure 5:
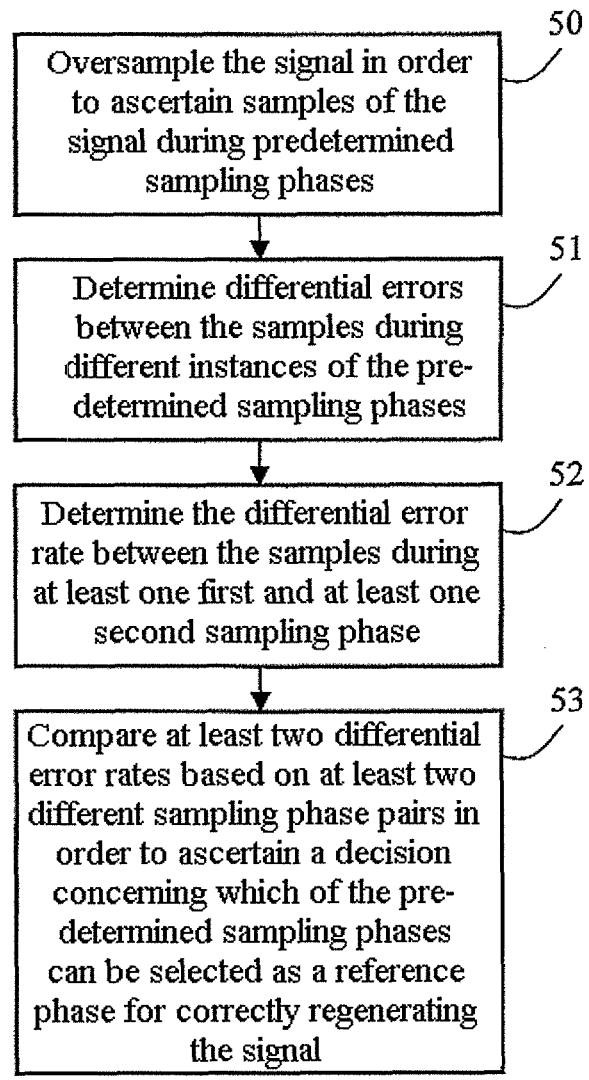
FIG. 5 shows an example embodiment of a method for regulating the sampling phase during the recovery of a serial data signal based on the oversampling of the data signal and the comparison of at least two differential error rates based on at least two different sampling phase pairs.

FIG. 5 shows a method, analogous to the recently cited circuit, for regulating the sampling phase during the recovery of a serial data signal on the basis of oversampling of the data signal and the comparison of at least two differential error rates based on at least two different sampling phase pairs.

Although the preceding text has illustrated and described specific embodiments, a person skilled in the art will recognize that the specific embodiments shown and described can be replaced by a large number of alternative and/or equivalent implementations without these falling outside the scope of protection of the present invention. The present application thus covers all adaptations or modifications of the specific embodiments described herein. Therefore, the invention is limited only by the subjects of the claims and the equivalents thereof.

The invention claimed is:

1. A method for controlling the sampling phase of a signal that is to be regenerated by sampling, comprising:
performing n-fold oversampling of the signal with n≥3, wherein n is an integer, in order to obtain n samples A(i) for n sampling phases AP(i) per period duration T of the signal with i=0, 1, ... n−1;
calculating differential errors Delta(i, i+m)=A(i+m)−A(i) between at least two respective samples A(i+m) and A(i) for at least two different i from i=0, 1, ... n−2 and at least one m with m≥1 with m+i≤n;
summing the differential errors Delta(i, i+m) for the at least two different i from i=0, 1, ... n−2 and the at least one m with m≥1 with m+i≤n;
calculating moving differential error averages SumDelta(i, i+m) of the summed differential errors Delta(i, i+m) for the at least two different i from i=0, 1, ... n−2 and the at least one m with m≥1 with m+i≤n over a predetermined number of sampling periods T';
comparing at least two moving differential error averages SumDelta(i, i+m) of the summed differential errors Delta(i, i+m) for the at least two different i from i=0, 1, ... n−2 and the at least one m with m≥1 with m+i≤n, in order to obtain at least one comparison result; and
using the at least one comparison result to decide which of the n sampling phases AP(i) the samples have the least discrepancy from an actual signal value on average for selection as a reference sampling phase.

2. The method as claimed in claim 1, further comprising calculating differential errors Delta(i, i+m) between further predetermined sample pairs for further i from i=0, 1, ... n−2 or further m with m≥1 with m+i≤n, or both.

3. The method as claimed in claim 1, further comprising using the differential error averages SumDelta(i, i+m) of the summed differential errors Delta(i, i+m) to derive at least two differential error rates DiffErrRate(i, i+m) between the samples during the i-th or (i+m)-th sampling phase for the at least two different i from i=0, 1, ... n−2 and the at least one m with m≥1 with m+i≤n.

4. The method as claimed in claim 3, further comprising comparing at least two of the derived differential error rates DiffErrRate(i, i+m) and DiffErrRate(i+o, i+m+o) based on at least two predetermined sampling phase pairs for 1≤m; 1≤o; m+i+o≤n, wherein a resulting further comparison result is used for a decision about which of the n sampling phases AP(i) can be selected as a reference sampling phase.

5. The method as claimed in claim 1, further comprising comparing at least one differential error rate DiffErrRate(i, i+m) with at least one predetermined differential error threshold, wherein a resulting further comparison result is used for a decision about which of the n sampling phases AP(i) can be selected as a reference sampling phase.

6. The method as claimed in claim 1, further comprising weighting at least two comparison results between the differential error averages SumDelta(i, i+m) and predetermined differential error thresholds relative to one another by means of a decision matrix to derive therefrom the decision concerning which of the n sampling phases AP(i) can be selected as a reference sampling phase.

7. The method as claimed in claim 6, wherein the signal is a digital communication signal which comprises a synchronization sequence, and wherein the comparison of the differential error averages SumDelta(i, i+m) with one another with the predetermined differential error thresholds takes place only when the synchronization sequence can be detected in the samples during at least two adjacent sampling phases.

8. The method as claimed in claim 7, wherein the decision concerning which of the n sampling phases AP(i) to select as a reference sampling phase is made, in the event of the synchronization sequence being able to be detected in the samples during three or more sampling phases, as a majority decision between the three or more sampling phases based on the differential error rates between these three or more sampling phases.

9. The method as claimed in claim 1, wherein the differential errors Delta(i, i+m) are summed using a shift register as a differential error register, wherein, per sampling period T', in the event of:
the absolute value of the compared samples being above or the same as a predetermined differential threshold $A_{Th}$: $|A(i+m)-A(i)|\geq A_{Th}$, that indicates a nonmatch between the compared samples, a logic "1" is shifted into the differential error register;
the absolute value of the compared samples being below the predetermined differential threshold $A_{Th}$: $|A(i+m)-A(i)|\geq A_{Th}$, that indicates a match between the compared samples, a logic "0" is shifted into the differential error register.

10. The method as claimed in claim 9, wherein the summation also comprises a count register which records the number of nonmatches for appropriate samples in the differential error register by virtue of:
each logic "1" shifted into the differential error register and at the same time each logic "0" shifted out of the differential error register involving the count register being raised;
each logic "0" shifted into the differential error register and at the same time each logic "0" shifted out of the differential error register, or each logic "1" shifted into the differential error register and at the same time each logic "1" shifted out of the differential error register, involving the count register remaining unchanged;
each logic "0" shifted into the differential error register and at the same time each logic "1" shifted out of the differential error register involving the count register being lowered.

11. The method as claimed in claim 9, wherein the differential error register has a depth of 32 bits.

12. A circuit for controlling the sampling phase of a signal that is to be regenerated by sampling, comprising:

means for oversampling the signal in order to ascertain samples of the signal during predetermined sampling phases;

means for determining differential errors between the samples during different instances of the predetermined sampling phases;

means for determining, on the basis of the determined differential errors, differential error rates between the samples during at least one first and at least one second respective sampling phase, to thereby determine the error rates based on respective predetermined sampling phase pairs; and means for comparing at least two of the determined differential error rates based on the respective predetermined sampling phase pairs in order to ascertain a decision which of the predetermined sampling phases to select as a reference sampling phase for correctly regenerating the signal.

13. A circuit for controlling the sampling phase of a signal that is to be regenerated by sampling, comprising:

an oversampling circuit configured to oversample the signal in order to ascertain samples of the signal during predetermined sampling phases;

an error determination circuit configured to determine differential errors between the samples during different instances of the predetermined sampling phases;

an error rate determination circuit configured to determine, on the basis of the determined differential errors from the error determination circuit, differential error rates between the samples during at least one first and at least one second respective sampling phase, to thereby determine the error rates based on respective predetermined sampling phase pairs; and a comparator circuit configured to compare at least two of the determined differential error rates based on the respective predetermined sampling phase pairs in order to ascertain a decision which of the predetermined sampling phases to select as a reference sampling phase for correctly regenerating the signal.

* * * * *